(12) United States Patent
Houldsworth et al.

(10) Patent No.: US 6,338,073 B1
(45) Date of Patent: Jan. 8, 2002

(54) FINALIZATION IN INCREMENTAL GARBAGE COLLECTORS

(75) Inventors: Richard J. Houldsworth, Horley; Steven Morris, Crawley, both of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/337,844

(22) Filed: Jun. 21, 1999

(30) Foreign Application Priority Data

Jun. 20, 1998 (GB) .............................................. 9813264

(51) Int. Cl.[7] .............................................. G06F 17/30
(52) U.S. Cl. ...................................................... 707/206
(58) Field of Search ......................... 707/206; 711/103, 711/165, 171

(56) References Cited

U.S. PATENT DOCUMENTS 5,784,699 A * 7/1998 McMahon et al. ........... 711/171
6,047,295 A * 4/2000 Endicott et al. ............. 707/206
6,055,612 A * 4/2000 Spertus et al. ............... 711/165

OTHER PUBLICATIONS

Gupta et al. (IEEE publication, 1988) discloses reliable garbage collection in distributed object oriented systems; Computer Software and Applications Confer., pp. 324–328 (1988).*

Srisa–An et al. (IEEE publication, 2000) discloses scalable hardware–algorithm for mark–sweep garbage collection, Euromicro Conf. 200, Proc. vol 1, pp. 274–281, (Sep. 2000).*

"One Pass Real–Time Generational Mark–Sweep Garbage Collection" by J. Armstrong et al, pp. 313–322.

"Mark During Sweep Rather Than Mark Then Sweep", by C. Quiennec et al, pp. 1–12.

"Uniprocessor Garbage Collection Techniques" by P.R. Wilson, pp. 1–54.

"Garbage Collection With Multiple Processes: An Exercies in Parallelism", by L. Lamport, pp. 50–54.

"Garbage Collection: Algorithms for Automatic Dynamic Memory Management", by R. Jones et al pp. 1–18.

* cited by examiner

Primary Examiner—Diane D. Mizrahi
(74) Attorney, Agent, or Firm—Peter Verdonk

(57) ABSTRACT

A data processing method and apparatus are described for mark-sweep garbage collection through stored data structures defined by data objects in a multi threading environment supporting the handling of *finalisers*. Pipelining of the marking (MA) and sweeping (GC) states is enabled by increasing the number of mark states M to four, namely Marked, Unmarked, Pending or Deletable. The sweeping stage GC consists of a linear sweep across the heap in which any objects with M=Deletable (detected non-reachables) are deleted at point D1, whilst objects with *finalisers* and M=Pending are placed on a finaliser queue and marked. The *finalising* stage executes *finalisers* for objects on the *finaliser* queue (D2). The method includes a synchronisation point (SP) where the results of the mark phase are passed onto the sweeping phase. The *synchronisation* point performs the following operation of rotating M for all objects; this operation converts the systems perception of the stored code indicating Marked to indicate Unmarked, with similar conversion for Unmarked to Pending, and Pending to Deletable. In operation, it takes two garbage collection cycles to move an Unmarked object to the Deletable state (D3), which is long enough to detect *finaliser*-reachability in the intervening mark phase.

12 Claims, 2 Drawing Sheets

FINALIZATION IN INCREMENTAL GARBAGE COLLECTORS

BACKGROUND OF THE INVENTION

The present invention relates to a method and apparatus for handling stored data objects and particularly, but not exclusively, to the handling of finalisation for objects in memory compaction and garbage collection procedures executing in real time in real or virtual memory space of a data processing apparatus.

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

Finalisation is a concept used in Sun Microsystems' Java® and other current garbage-collected languages and programming environments, such as Modula-3 and Cedar. Stored data objects may have an associated finaliser which is to be executed after the object nominally becomes available for garbage collection but before the data is collected. The purpose of this feature is to allow an object to clean up any other system resources the object has claimed before it is destroyed. For example, the finaliser for a Java File object would close all the system file handles claimed by the object.

However, as a finaliser is just another of the class of object handling methods, with all the power of other methods, the finaliser procedure can access all data objects accessible from the object being finalised. Therefore, all objects reachable by a finaliser must be explicitly excluded from garbage collection. Furthermore, it is possible for the finaliser method to resurrect any such objects reachable by a finaliser, including the object being finalised itself, by making the object reachable again. Consequently, a garbage collection procedure cannot delete any objects that are reachable from a finalisable object until its finaliser has executed and the reachability of the objects has been re-evaluated. In Java and other languages, the possibility of an object repeatedly resurrecting itself is typically removed by stating that the finaliser for each instance is executed only once. This control on finalisation will be assumed herein.

In PC's or workstations, the extra processing and memory load to support finalisation is not usually a problem due to the amount of memory typically available in a PC, although the support will, of course, affect the overall efficiency. In low-memory environments such as set-top boxes, however, support for finalisers can cause problems and even a concurrent or incremental garbage collector may have to halt the program until it has executed some or all of the outstanding finalisers and reclaimed any memory used by them.

SUMMARY OF THE INVENTION

It is therefore an object of the present invention to provide an incremental garbage collection system which supports finalisable objects whilst minimising the time-to-collection for objects wherever possible.

In accordance with the present invention there is provided a concurrent garbage collection and marking method for traversing data structures formed of data objects linked by identifying pointers in a contiguous heap memory, with garbage collection of data objects classed as deletable, the method comprising the steps of:

a) for a selected root object, traversing the pointers carried thereby to determine the objects linked to the root object; and b) traversing pointers to determine further objects linked to those identified by the previous step;

wherein step b) is repeated until no further pointers remain to be traversed following which the objects identified therein are classed as marked, and all remaining objects in the heap are classed as unmarked unless already classed as such due to an earlier traversal operation in which case they are classed as deletable, characterised in that some of the heap data objects carry finalisers and some further objects are identified as potentially reachable by finalisers which objects are classed as pending, wherein, at the end of each sweep, those objects classed as marked are reclassed as unmarked, those objects classed as unmarked are reclassed as pending, those objects classed as pending are reclassed as deletable, and those objects already classed as deletable are deleted.

The present invention also provides data processing apparatus comprising a data processor coupled with a random access memory containing a plurality of data objects linked in data structures by identifying pointers and within a heap in a contiguous area of the memory, the apparatus further comprising first additional storage means containing for each heap object an identifier for one of a predetermined set of marking classes, and the processor being configured to effect the following operations on the stored plurality of data objects:

a) for a selected root object, traversing the pointers carried thereby to determine the objects linked to the root object; and b) traversing pointers therefrom to determine further objects linked to those identified;

wherein the processor repeats operation b) until no further pointers remain to be traversed following which the stored class identifiers for the objects identified therein are set as marked, and for all remaining objects in the heap are set as unmarked unless already set as such due to an earlier traversal operation in which case they are set as deletable, characterised in that some of the heap data objects carry finalisers and some further objects are identified as potentially reachable by finalisers which objects are classed as pending, wherein, at the end of each sweep, the processor is arranged for those objects classed as marked to reclass as unmarked, for those objects classed as unmarked to reclass as pending, for those objects classed as pending to reclass as deletable, and to delete those objects already classed as deletable.

In a preferred embodiment, the object reclassification comprises global reinterpretation of mark state classifiers rather than alteration of any individual classifier: in terms of the apparatus configuration, this means the processor is arranged to effect object mark state reclassification by rotating internally held values for each mark class and consequently the need to alter the stored mark state code (suitably a 2-bit binary code) for each and every stored object is avoided.

By way of a refinement for the handling of finalisers, heap data objects carrying finalisers may suitably include a respective flag which, when set, prevents the object from being reclassed as deletable and/or heap data objects carrying finalisers and classed as pending, when located during traversal, may be explicitly placed in a finalisation queue for execution of their finalisers.

As a further refinement, in the apparatus configuration the processor may be further arranged to track the number of objects with finalisers identified during marking, to compare this with a maintained count of finalisers allocated to the heap and, on identification that the totals match, to delete those objects classed as pending at the same time as deleting those objects classed as deletable. This enables earlier removal of certain classes of garbage objects, leading to a general improvement in efficiency.

BRIEF DESCRIPTION OF THE DRAWINGS

Preferred embodiments of the invention will now be described, by way of example only, with reference to the accompanying drawings, in which.

DESCRITPITON OF THR PREFERRED EMBODIMENTS

Figure 1:
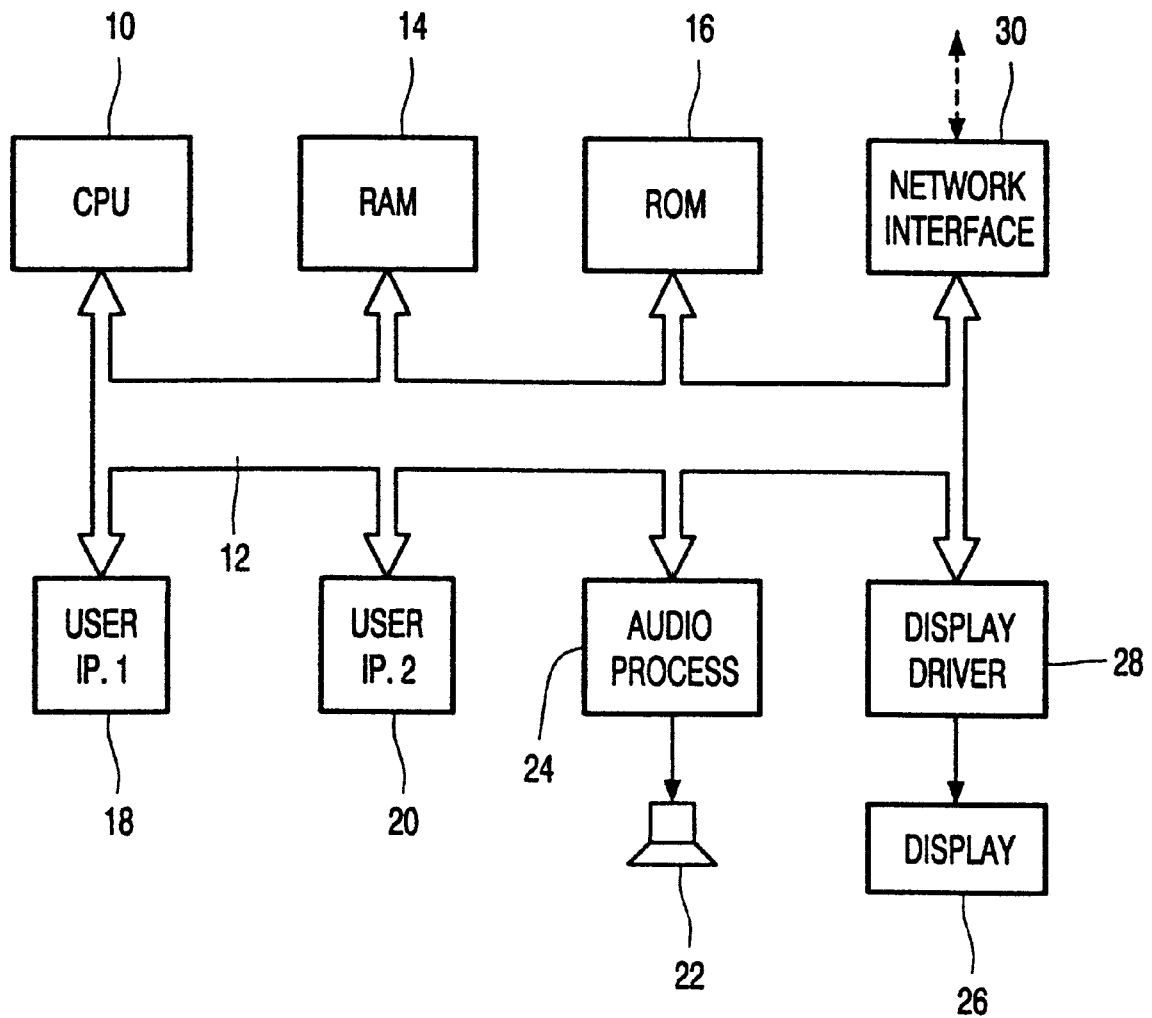
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 under control of the CPU 10; a controlling program for this may initially be held in ROM 16 and loaded up with the operating system on power-up. The following examples are compliant with memory management techniques in the Java (® Sun Microsystems Inc) virtual machine and the terminology should be construed accordingly: it will be recognised however that the present invention is not restricted to Java-compliant systems, nor to purely virtual memory management.

In the following, a number of particular terms having special meaning will be used, as follows. Root objects are globally accessible stored data objects in systems: in Java, these are represented by static data fields and stacks. Reachable objects are stored data objects connected to the data structure headed by the root objects of the system: during garbage collection, the marking process should find all reachable objects in one garbage collection cycle. Non-reachable objects are those stored data objects not connected to the data structure; they are inaccessible to running programs and are hence candidates for garbage collection.

Finalisable objects are data objects which have nominally become garbage as they are non-reachable, but which also have a non-empty finaliser that has not yet been executed. A finaliser may only be executed once, so an object is considered finalisable if its finaliser has not yet been executed by the garbage collector. Finaliser-reachable objects are a subset of the group of non-reachable objects which can be reached through tracing from finalisable objects: these objects should not be garbage collected.

Mutator threads are threads of execution in an incremental garbage collection system: the name comes from their effect of mutating the heap memory holding the stored data objects concurrently with the garbage collection threads, whilst a garbage collection thread is a dedicated system thread whose purpose is to collect garbage objects and create more free space in the heap. A finaliser thread is a dedicated system thread which will run finalisation code for unreachable objects with finalisers.

The detection period is the time period between the last reference to an object being removed and its detection as an unreachable object. In mark-sweep collectors this is determined by the duration of the marking cycle. The reclamation period is the time between an object being detected as non-reachable and the point at which it is deleted. In mark-sweep garbage collectors, this is determined by the duration of the sweep cycle and the presence of finalisable objects.

The present invention is embodied in an incremental garbage collection system which supports finalisable objects but that minimises the "time-to-collection" for all objects, wherever possible bypassing the extra partition stage for finaliser-reachable objects.

By way of illustration, it will be useful to first consider a commonly used technique for finalising garbage collection, used for example in the Sun Java® Virtual Machine v1.0.2. The typical non-finalising garbage collection cycle can be described independently of implementation details as firstly the partition of the heap into reachable and non-reachable sets of data objects, followed by garbage collection of the non-reachable set. Finalisation complicates garbage collection by adding a new stage to each garbage collection cycle, such as to comprise partition of heap into reachable and non-reachable sets, as before. This is followed by partition of the non-reachable set into garbage and finaliser-reachable sets and finally garbage collection is implemented on the garbage set and finaliser execution is implemented on the finaliser-reachable set.

This lengthening of the cycle means that the lag between objects becoming non-reachable and their collection is made greater, with the consequence that a larger proportion of the heap is used up by garbage objects and therefore a smaller area of the heap is available for new data items. Also, the strong dependencies between the stages in the cycles mean that most implementations will have poor concurrency characteristics, with large pauses in the mutator threads as the garbage collection algorithm proceeds. Considering that the number of finalisable objects in a typical system is a small percentage of the set of active objects, the added overhead of finaliser support is disproportionately large. The state of each object in the system is identified by two variables M and F, where M may be Marked (including any other mark states) or Unmarked, and F can indicate Finaliser or No Finaliser.

Figure 2:
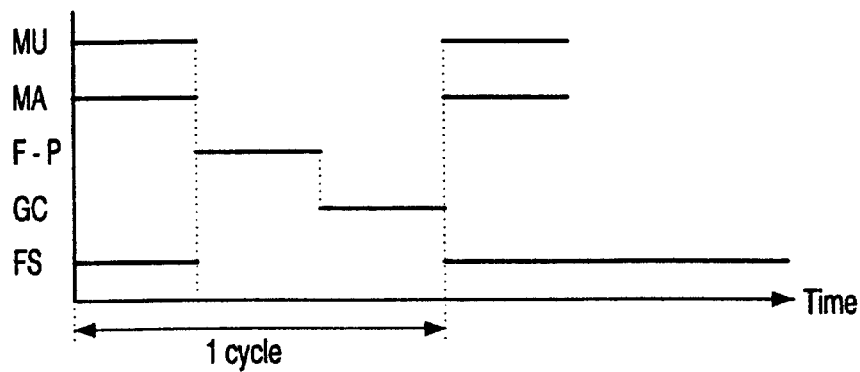
FIGS. 2 to 4 represent concurrency of marking and sweeping operations in prior art and first and second embodiments of the present invention respectively.

The separate tasks relevant to the garbage collector and their interaction in the simple system are shown in FIG. 2. The mutator threads MU may create new objects in the heap at any time. The marking stage MA involves the tracing of objects from root objects. Objects found by this tracing have M=Marked, and marking can be performed in the garbage collection thread or, in the illustrated case of incremental garbage collection, in the mutator threads. The finaliser partitioning F-P involves sweeping over the heap placing objects with M=Unmarked and F=Finaliser in a queue, then a mark phase using finalisable objects as roots: this runs in the garbage collection GC thread. The finalisation stage FS involves the execution of finalisers in the queue, and sets F=No Finaliser for objects after execution. This may run in the garbage collection GC thread or, as shown, in a dedicated finaliser thread FS.

This technique has some poor characteristics, the first of which is poor concurrency with the steps of mark phase MA, finaliser partition F-P, and garbage collection sweep GC occurring serially. Consequently, the inherent independence between the tasks cannot be exploited in a multi-threaded system. Another problem is the generally long reclamation times for all objects. For non-finaliser-reachable garbage (which will be the vast majority), no garbage will be collected in this cycle until the finaliser partition F-P is completed. This is wasteful as the objects will have been examined during the finalisation partition F-P anyway. With incremental garbage collection algorithms, the system pause for mutators whilst finaliser partition F-P and the garbage collection GC sweep occur is unacceptably long, taking up two complete sweeps over the heap plus the finaliser-reachable marking phase.

In order to reduce these delays, we have recognised that a different way of partitioning tasks between threads for more efficient use of multi threading is required, whilst retaining the capability for efficiently handling finalisers. A first improvement is achieved by pipelining the marking and sweeping states which is achievable by expanding the number of marking states. Background to the technique of pipelining in systems not handling finalisers, and making use of three marking states (M=Marked, Unmarked or Deletable), may be found in, for example, "Garbage Collection with multiple processes: an exercise in parallelism" by L. Lamport, Proceedings of the 1976 International Conference on Parallel Processing, pp. 50–54, or "Mark DURING Sweep rather than Markh THEN Sweep" by C. Queinnec et al, Lecture Notes in Computer Science 365, pp. 224–237, June 1989. We have recognised that particular benefits, including the ability to handle finalisers, may be obtained by increasing the number of mark states to four, such that M may be Marked, Unmarked, Pending or Deletable, with only 2-bits required per object for storing M.

Figure 3:
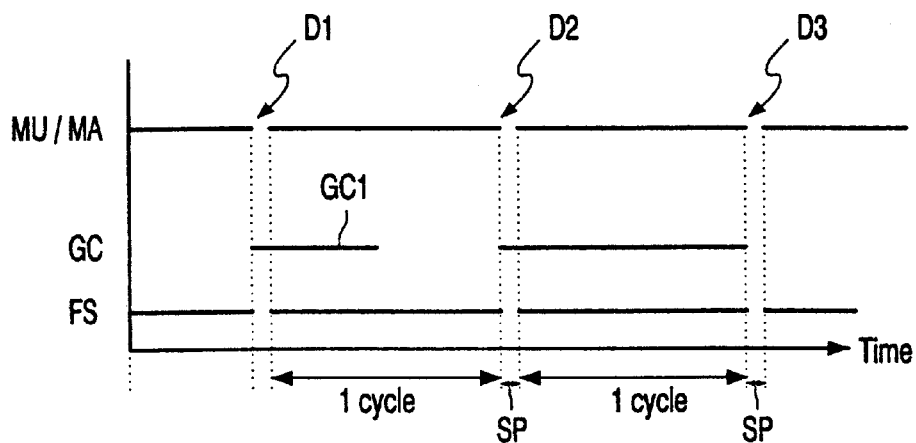

FIG. 3 shows the resultant concurrency of marking and sweeping in this improved arrangement. As before, mutators MU are performed modifying or creating new objects on the heap, whilst the marking phase MA in tandem with the mutator handling marks objects accessible from the root objects. M=Marked is set for found objects with a synchronisation point SP (to be described below) occurring on completion. This may be performed in any threads.

The sweeping stage GC consists of a linear sweep across the heap in which any objects with M=Deletable (detected non-reachables) are deleted at point D1, whilst objects with M=Pending and F=Finaliser are placed on a finaliser queue and marked. Sweeping is performed in the garbage collection thread as indicated at GC1 and, on completion, waits for the synchronisation point SP. The finalising stage executes finalisers for objects on the finaliser queue and sets F=No Finaliser after running at point D2. Finalising is performed in the garbage collection thread or a dedicated finalising thread.

The method includes a synchronisation point (as mentioned above) where the results of the mark phase are passed onto the sweeping phase. The next mark phase and the sweep cycle may both begin immediately after the synchronisation point SP: although the sweep thread may, as shown, commence at the start of the synchronisation point SP, it will just handle matters such as state changes and so forth until SP is concluded when the actual sweep commences. The synchronisation point itself performs the following operations:

1. Rotate or shift M for all objects; this operation converts the systems perception of the stored code (e.g binary 10) indicating Marked to indicate Unmarked following rotation, with similar conversion for Unmarked to Pending, and Pending to Deletable. Rather than requiring a sweep over all of the objects, and alteration of all the respective stored mark state bits, this operation is performed by rotating or shifting the meanings of the mark state bits.

2. Assign the new root objects for the next mark phase, including those objects in the current finalisation queue.

Adding the new mark states together with an efficient method of rotating the states allows software pipelining of the finaliser-reachable scan and the garbage scan. It takes two garbage collection cycles to move an Unmarked object to the Deletable state (point D3 in FIG. 3), which is long enough to detect finaliser-reachability in the intervening mark phase. The merging of the root marking and finaliser reachable marking reduces code size and also eliminates the need for finaliser-partition (F-P; FIG. 2) to separate finaliser-reachable objects. The short synchronisation point SP is the only point at which the mutator threads are blocked. This method therefore has excellent incremental and multi-threading performance as the sweep, finaliser and mutator threads operate with a high degree of independence. The cycle time is shorter too, as each cycle consists of only one mark phase and one sweep operating concurrently. Due to this, and the high proportion of the cycle for which the marking process is active, the detection period for non-referenced objects is also likely to be reduced.

In operation, the garbage collection sweep triggers marking of the finaliser-reachable set when it comes across objects in the Pending state. Thus the sweeper effectively drives the marking process in contrast to conventional mark-sweep processes where the marker is driven by an independent root set held outside the heap.

As an enhancement to the four mark-state technique described above with reference to FIG. 3, a means may additionally be provided for reliably detecting whether objects in the Pending state can safely be deleted, since, in the vast majority of cycles, no new finalisable objects become unreachable and, in these cycles, all Pending objects will become Deletable on the next cycle, such that they could theoretically be deleted in the Pending cycle. This procedure is performed by tracking the number of objects with finalisers that have been found during marking, and comparing with a known and stored total allocated in the heap. As the finalisation queue is included in the marking process, the only finalisables not located during marking are those that have become non-reachable during the previous collection cycle. When not all finalisable objects have been located in the previous mark phase, then there is a non-empty set of finaliser-reachable objects to identify in the sweep. However, when all finalisables are accounted for, all Pending objects are known to be garbage, and can be deleted immediately.

The object states are as for the FIG. 3 example, but with three new global variables added:

finaliser_count A count of the total number of finalisable objects in the heap found_count The number of finaliser-reachable objects located during the mark process shortcut A flag indicating how the sweep process should behave this cycle.

Figure 4:
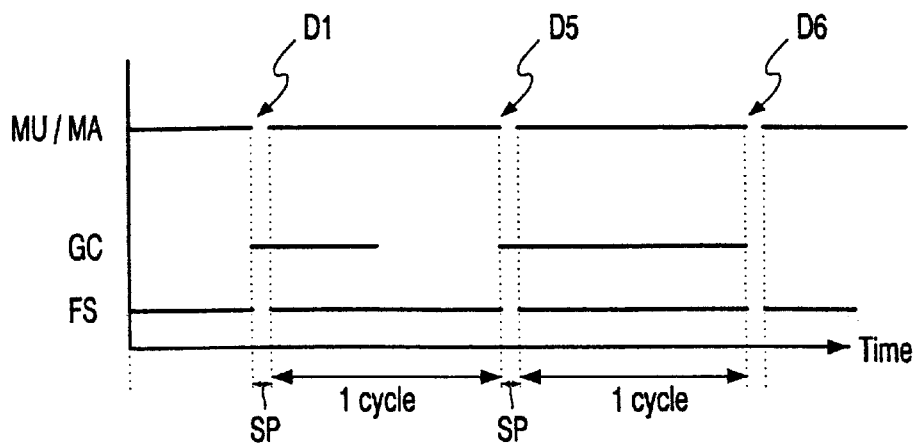

The tasks are carried out generally as for the FIG. 3 example, but with some exceptions as illustrated by FIG. 4. In the case of the mutators, if a new object has F=Finaliser then finaliser_count is incremented. During marking, if a found object has F=Finaliser, then found_count is incremented. During sweeping, if the variable "shortcut" is true, then both M=Pending and M=Deletable are deleted at point D5; if "shortcut" is false, then any objects with M=Deletable will be deleted and any objects with M=Pending and F=Finaliser are placed on the finaliser queue and marked for subsequent deletion at point D6. Finalising is handled as before but, after running the finaliser thread for an object, F is set to No Finaliser, the object is marked, and both found_count and finaliser_count are decremented.

The procedure applied at the synchronisation point now includes evaluation of the count variables where, after rotating the meaning of M and assigning the root objects, the variable "shortcut" is set to the result (found_count= finaliser_count).

FIG. 4 shows this optimised finalisation model with additional reclamation through use of the "shortcut" variable: as will be recognised, in comparison with the FIG. 3 technique, that of FIG. 4 guarantees 1-cycle reclamation when no finalisers are used and a maximum of 2-cycle reclamation for all non-finaliser-reachable data objects.

In the generally rare event that data structure containing more than one finalisable object becomes non-reachable, the number of finalisables detected this cycle becomes uncertain due to a race condition between the marking process and the progress of the scan. For example, object F1 is found by the sweep, added to the finalisation queue, and marked: F1 references another finalisable object F2, which is also non-reachable in this cycle. Depending on the behaviour of the marking algorithm, F2 may be reached by the marker before or after the first sweep reaches it. F2 is only added to the finalisation list this cycle if the sweeper reaches it first. A possible solution would be to place objects on the finalising queue as they are marked, such that the same actions will be taken for an object regardless of whether it is found by the sweep or marking process.

An aggressive marking algorithm will tend to prevent lower finalisables in a connected data structure from entering the queue during the same cycle as the top levels of the structure, leading to a semi-topological ordering of finalisers. This typically aids recycling rates as higher objects in a data structure will have a larger reachable set than lower terms, and will therefore tend to make more objects unreachable on deletion.

Conversely, marking of finalisables located during the sweep may be delayed until the sweep completes, such that all newly non-reachable finalisables will be added to the finalisation queue. This aids predictability, and permits a strengthening of the reclamation period definitions: 1-cycle reclamation is guaranteed when no non-reachable finalisable objects are detected in the previous marking phase.

Although defined principally in terms of a software browser implementation, the skilled reader will be well aware than many of the above-described functional features could equally well be implemented in hardware.

From reading the present disclosure, other modifications will be apparent to persons skilled in the art. Such modifications may involve other features which are already known in the design, manufacture and use of image processing and/or data network access apparatus and devices and component parts thereof and which may be used instead of or in addition to features already described herein.

What is claimed is:

1. A concurrent garbage collection and marking method for traversing data structures formed of data objects linked by identifying pointers in a contiguous heap memory, with garbage collection of data objects classed as deletable, the method comprising the steps of:

a) for a selected root object, traversing the pointers carried thereby to determine the objects linked to the root object; and b) traversing pointers to determine further objects linked to those identified by the previous step;

wherein step b) is repeated until no further pointers remain to be traversed, in such a fashion that, I. the objects identified therein are classed as marked, II. all remaining objects in the heap are classed as unmarked unless already classed as such due to an earlier traversal operation in which case they are classed as deletable, III. some of the heap data objects carry finalisers, IV. some further objects are identified as potentially reachable by finalisers which objects are classed as pending, and V. at the end of each sweep, A) those objects classed as marked are reclassed as unmarked, B) those objects classed as unmarked are reclassed as pending, C) those objects classed as pending are reclassed as deletable, and D) those objects already classed as deletable are deleted.

2. A method as claimed in claim 1, wherein object reclassification comprises global reinterpretation of mark state classifiers rather than alteration of any individual classifier.

3. A method as claimed in claim 1, wherein heap data objects carrying finalisers include a respective flag which, when set, prevents the object from being reclassed as deletable.

4. A method as claimed in claim 1, wherein heap data objects carrying finalisers and classed as pending, when located during traversal, are placed in a finalisation queue for execution of their finalisers.

5. A data processing apparatus comprising a data processor coupled with a random access memory containig a plurality of data objects linked in data structures by identifying pointers and within a heap in a contiguous area of the memory, the apparatus further comprising first additional storage means containing for each heap object an identifier for one of a predetermined set of marking classes, and the processor being con-figured to effect the following operations on the stored plurality of data objects:

a) for a selected root object, traversing the pointers carried thereby to determine the objects linked to the root object; and b) traversing pointers therefrom to determine further objects linked to those identified;

wherein the processor repeats operation b) until no further pointers remain to be traversed in such a fashion that
  I. the stored class identifiers for the objects identified therein are set as marked, and
  II. for all remaining objects in the heap are set as unmarked unless already set as such due to an earlier traversal operation in which case they are set as delegable,
  III. some of the heap data objects carry finalisers and
  IV. some further objects are identified as potentially reachable by finalisers which objects are classed as pending,
  V. the processor is arranged to achieve the following at the end of each sweep,
    A) reclass those objects classed as marked as unmarked,
    B) reclass those objects classed as unmarked as pending,
    C) reclass those objects classed as pending as deletable, and
    D) delete those objects already classed as deletable.

6. Apparatus as claimed in claim 5, wherein the processor is arranged to effect object mark state reclassification by rotating internally held values for each mark class.

7. Apparatus as claimed in claim 5, wherein each heap object mark class indicator is stored in said first additional storage means as a 2-bit binary code.

8. Apparatus as claimed in claim 5, wherein the processor is further arranged to track the number of objects with finalisers identified during marking, to compare this with a maintained count of finalisers allocated to the heap and, on identification that the totals match, to delete those objects classed as pending at the same time as deleting those objects classed as deletable.

9. At least one medium, readable by at least one data processing device embodying:

data structures comprising
    Data objects; and
    Identifying pointers linking the data objects in a contiguous heap memory;

code for causing the at least one data processing device to perform at least the following garbage collection, marking, and traversing operations:
    a) for a selected root object, traversing the pointers carried thereby to determine the objects linked to the root object; and
    b) traversing pointers to determine further objects linked to those identified by the previous step;
    c) repeating, step b) until no further pointers remain to be traversed in such a fashion that:
      i) the objects identified therein are classed as marked,
      ii) all remaining objects in the heap are classed as unmarked unless already classed as such due to an earlier traversal operation in which case they are classed as deletable,
      iii) some of the heap data objects carry finalizers
      iv) some further objects are identified as potentially reachable by finalizers which objects are classed as pending,
      v) at the end of each sweep,
        A) those objects classed as marked are reclassed as unmarked,
        B) those objects classed as unmarked are reclassed as pending,
        C) those objects classed as pending are reclassed as deletable, and
        D) those objects already classed as deletable are deleted.

10. The at least one medium as claimed in claim 9, wherein object reclassification comprises global reinterpretation of mark state classifiers rather than alteration of any individual classifier.

11. The at least one medium as claimed in claim 9, wherein heap data objects carrying finalizers include a respective flag which, when set, prevents the object from being reclassed as deletable.

12. The at least one medium as claimed in 9, wherein heap data objects carrying finalizers and classed as pending, when located during traversal, are placed in a finalization queue for execution of their finalizers.

* * * * *